US012724702B1

(12) United States Patent
Gueta et al.

(10) Patent No.: US 12,724,702 B1
(45) Date of Patent: Sep. 1, 2026

(54) SYSTEM, METHOD, AND COMPUTER PROGRAM FOR GENERATIVE ARTIFICIAL INTELLIGENCE AUTOMATION FLOWS

(71) Applicant: Amdocs Development Limited, Limassol (CY)

(72) Inventors: Limor Gueta, Mabuim (IL); Dror Avrilingi, Modiin (IL); Itsik David, Petach Tiqwa (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 206 days.

(21) Appl. No.: 18/373,209

(22) Filed: Sep. 26, 2023

(51) Int. Cl.
*G06F 11/3698* (2025.01)
*G06F 11/3668* (2025.01)
*G06N 5/022* (2023.01)

(52) U.S. Cl.
CPC ...... *G06F 11/3698* (2025.01); *G06F 11/3688* (2013.01); *G06N 5/022* (2013.01)

(58) Field of Classification Search
CPC .. G06F 11/3698; G06F 11/3688; G06N 5/022
See application file for complete search history.

(56) References Cited

U.S. PATENT DOCUMENTS 9,021,440 B1 * 4/2015 Chandrasekaran .......................... G06F 11/3684 717/124
10,223,245 B1 * 3/2019 Elgarat ............... G06F 11/3672
2019/0213116 A1 * 7/2019 Kulkarni ............ G06F 11/3684

OTHER PUBLICATIONS

Wang, C., Pastore, F., Goknil, A., Briand, L., & Iqbal, Z. (Jul. 2015). Automatic generation of system test cases from use case specifications. In Proceedings of the 2015 international symposium on software testing and analysis (pp. 385-396). (Year: 2015).*

Thummalapenta, S., Sinha, S., Singhania, N., & Chandra, S. (Jun. 2012). Automating test automation. In 2012 34th international conference on software engineering (ICSE) (pp. 881-891). IEEE. (Year: 2012).*

Kamal, M. M., Darwish, S. M., & Elfatatry, A. (Apr. 2019). Enhancing the automation of GUI testing. In Proceedings of the 8th International Conference on Software and Information Engineering (pp. 66-70). (Year: 2019).*

(Continued)

*Primary Examiner* — Wei Y Mui
*Assistant Examiner* — Vivian Weijia Duan
(74) *Attorney, Agent, or Firm* — Zilka-Kotab, P.C.

(57) ABSTRACT

As described herein, a system, method, and computer program are provided for generative AI automation flows. Input describing a new requirement for an application is processed, using generative artificial intelligence, to generate one or more test cases for the application. Key words of the one or more test cases are determined. A tokenized dictionary is built using the key words. User interface components of the application are discovered. One or more automation scripts are automatically generated for each of the user interface components of the application. A machine learning model is used to build an end-to-end automation flow for testing the application, wherein the end-to-end automation flow connects the one or more automation scripts generated for each of the user interface components of the application to the one or more test cases generated for the application. The end-to-end automation flow is executed for testing the application.

17 Claims, 5 Drawing Sheets

(56) References Cited

OTHER PUBLICATIONS

Blixt, F. (2021). Real-time auto-test monitoring system. (Year: 2021).*

Memon, A. M., Pollack, M. E., & Soffa, M. L. (2002). Hierarchical GUI test case generation using automated planning. IEEE transactions on software engineering, 27(2), 144-155. (Year: 2002).*

Pham, P., Nguyen, V., & Nguyen, T. (Oct. 2022). A review of ai-augmented end-to-end test automation tools. In Proceedings of the 37th IEEE/ACM International Conference on Automated Software Engineering (pp. 1-4). (Year: 2022).*

* cited by examiner

SYSTEM, METHOD, AND COMPUTER PROGRAM FOR GENERATIVE ARTIFICIAL INTELLIGENCE AUTOMATION FLOWS

FIELD OF THE INVENTION

The present invention relates to automation flows for testing code.

BACKGROUND

Today, in order to build automation flows for testing code, a person needs to read the project requirements and identify the key features and functionalities that need to be tested, then, based on the identified requirements, define the various scenarios that need to be tested. For example, if you are testing a login page, you might define test scenarios such as "successful login with valid credentials," "failed login with invalid credentials," "forgot password functionality," etc.

The person also needs to create test cases for each scenario, build a step-by-step guide for executing the test case, define the expected outcome of the test case, prioritize the test cases based on their importance and impact on the system (e.g. high priority test cases should be executed first), and finally obtain review and approval by solution and development teams. This is full manual process that consumes time and may create missing coverage due to human error or lack of knowledge.

There is thus a need for addressing these and/or other issues associated with the prior art. For example, there is a need to use generative artificial intelligence (AI) to build automation flows for testing code.

SUMMARY

As described herein, a system, method, and computer program are provided for generative AI automation flows. Input describing a new requirement for an application is processed, using generative AI, to generate one or more test cases for the application. Key words of the one or more test cases are determined. A tokenized dictionary is built using the key words. User interface components of the application are discovered. One or more automation scripts are automatically generated for each of the user interface components of the application. A machine learning model is used to build an end-to-end automation flow for testing the application, wherein the end-to-end automation flow connects the one or more automation scripts generated for each of the user interface components of the application to the one or more test cases generated for the application. The end-to-end automation flow is executed for testing the application.

DETAILED DESCRIPTION

Figure 1:
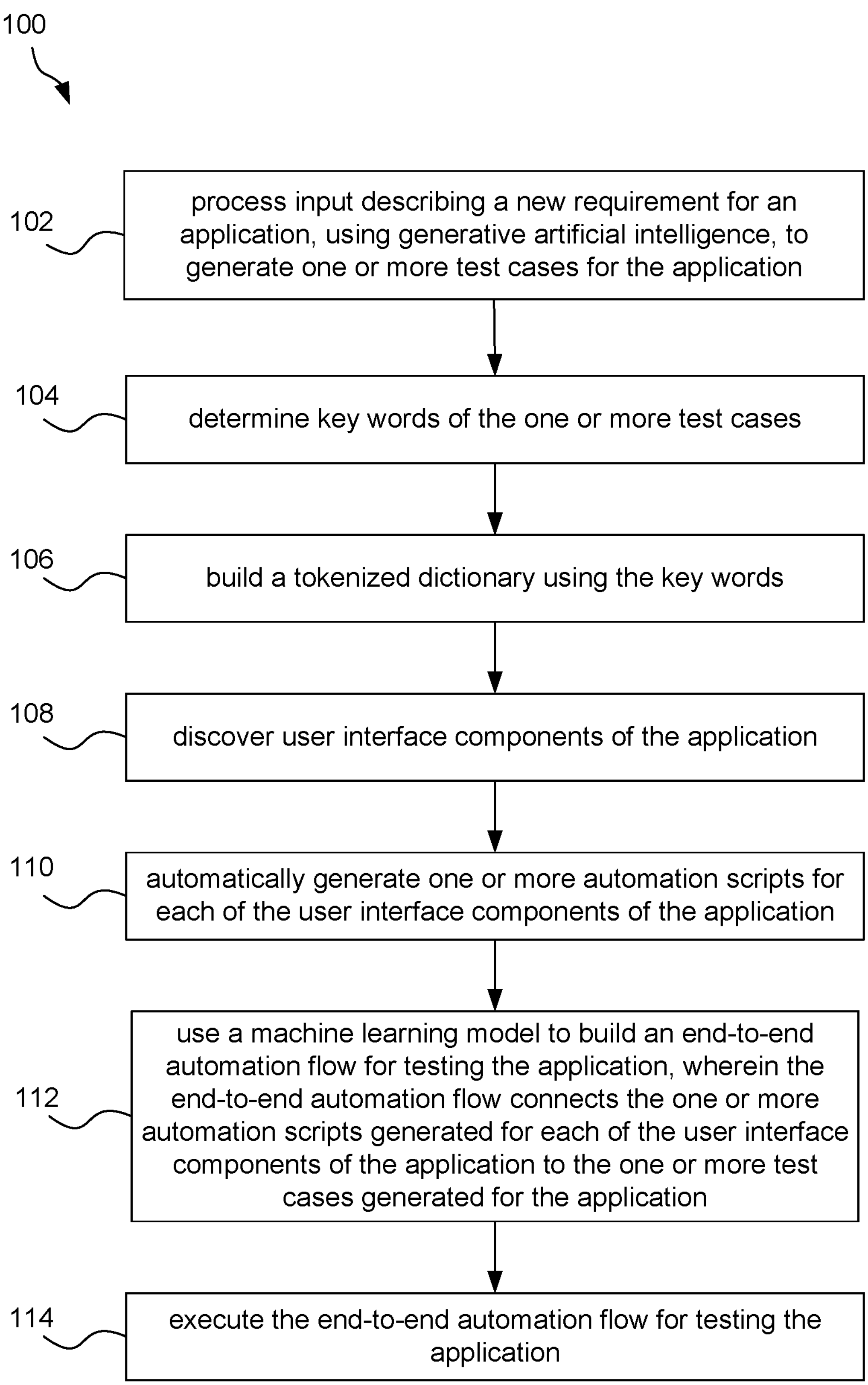
FIG. 1 illustrates a method for using generative AI to create an automation flow, in accordance with one embodiment.

FIG. 1 illustrates a method 100 for using generative AI to create an automation flow, in accordance with one embodiment. The method 100 may be carried out by a computer system, such as that described below with respect to FIGS. 4 and/or 5. For example, the method 100 may be performed by a computer system used for testing computer applications.

In operation 102, input describing a new requirement for an application is processed, using generative AI, to generate one or more test cases for the application. The input refers to any user generated or automatically generated information that describes a new requirement for an application. In an embodiment, the input may be created using prompt engineering. In an embodiment, the input may include a description of the new requirement with a relevant specification and roles.

The application refers to computer code, which when executed, performs some functionality. In the present embodiment, the application includes one or more user interfaces for presentation to end users of the application. Thus, the application may be a user-interface based application that includes one or more user interfaces having a plurality of user interface components. The new requirement for the application refers to a new functionality of the application. In an embodiment, the new requirement may be a new business requirement for the application.

As noted above, the input is processed, using generative AI, to generate one or more test cases for the application. Accordingly, the test case(s) may be specific to the new requirement. In an embodiment, each test case may be set of actions, which when performed on a computer system executing the application, determine if the application satisfies the new requirement.

The generative AI refers to a generative AI model that processes the input to generate the test case(s) for the application. In an embodiment, the generative AI model may be trained on historical data that correlates test cases with defined application requirements. In an embodiment, the one or more test cases may be output (i.e. in a user interface) for acceptance by a user.

In operation 104, key words of the one or more test cases are determined. In an embodiment, the key words may be determined using natural language processing (NLP). For example, the test cases may be parsed by a NLP component that derives the key words from the test case(s).

In operation 106, a tokenized dictionary is built using the key words. For example, dictionary-based tokenization may be applied to the key words to build the tokenized dictionary. In an embodiment, building the tokenized dictionary using the key words may include creating automation assets in a shared repository.

In operation 108, user interface components of the application are discovered. The user interface components refer to components included in the user interfaces of the application. The user interface components may be components for receiving user input and/or components for presenting data to an end user. For example, the user interface components of the application may include a drop down box, a check box, a hyper link, a radio button, etc.

In an embodiment, the user interface components of the application may be discovered by applying machine learning to a HyperText Markup Language (HTML) file associated with (e.g. defining, etc.) the application. In an embodiment, the user interface components of the application may be discovered by applying machine learning to a swagger document associated with the application.

In operation 110, one or more automation scripts are automatically generated for each of the user interface components of the application. An automation script refers to code that executes to perform automated testing of the application. In an embodiment, the one or more automation scripts are automatically generated for each of the user interface components of the application using a template automation script associated with the user interface component.

In operation 112, a machine learning model is used to build an end-to-end automation flow for testing the application, wherein the end-to-end automation flow connects the one or more automation scripts generated for each of the user interface components of the application to the one or more test cases generated for the application. By connecting the automation scripts to the test cases, the automation scripts may be executable to test the application in accordance with the test cases. In an embodiment, the end-to-end automation flow may provide full coverage testing for the new requirement.

In operation 114, the end-to-end automation flow is executed for testing the application. The execution of the end-to-end automation flow may therefore include automated testing of the application, and in particular automated testing that the application satisfies the new requirement. Results of the execution of the end-to-end automation flow may be output. In an embodiment, the results may be output in a user interface for presentation to a user.

In an optional embodiment, the method 100 may also include optimizing the end-to-end automation flow. This optimization may occur before or after the end-to-end automation flow is executed in operation 114. In an embodiment, the end-to-end automation flow may be optimized to provide full coverage testing for the new requirement. In an embodiment, the end-to-end automation flow may be optimized to include a minimum set of test cases that provide full coverage testing for the new requirement, for example, to reduce an execution time of the end-to-end automation flow.

In an embodiment, the method 100 may also include outputting the optimized end-to-end automation flow for approval by a user. In an embodiment, the method 100 may also include relearning the machine learning model, based on the optimized end-to-end automation flow. In an embodiment, the machine learning model may be relearned based on results of executing the optimized end-to-end automation flow on the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
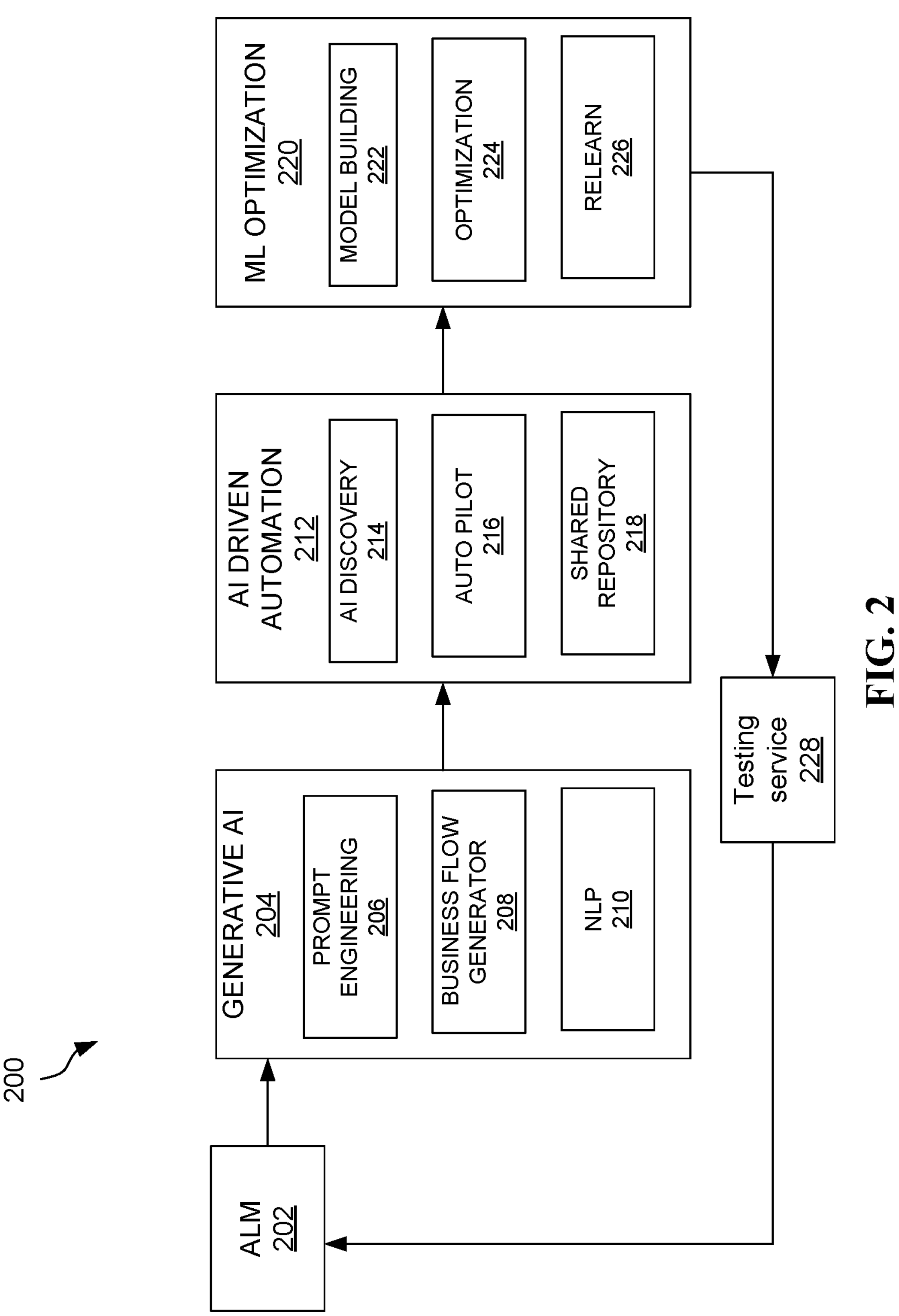
FIG. 2 illustrates components of a system for using generative AI to create an automation flow, in accordance with one embodiment.

FIG. 2 illustrates components of a system 200 for using generative AI to create an automation flow, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an application lifecycle management (ALM) component 202 communicates with a generative AI component 204. The ALM component 202 operates to manage a lifecycle of an application.

The generative AI component 204 includes a prompt engineering component 206 which is used to obtain user input describing a new requirement for the application. The generative AI component 204 also includes a business flow generator 208 which processes the input, using generative artificial intelligence, to generate one or more test cases for the application. The generative AI component 204 includes an NLP component 210 which then determines key words of the one or more test cases. The generative AI component 204 may be built from historical data including epics, features, and a corresponding coverage scenario per application.

The generative AI component 204 communicates with an AI driven automation component 212. For example, the generative AI component 204 may output the test cases and key words to the AI driven automation component 212. In an embodiment, the output of the generative AI component 204 may be validated by a user via a prompt.

The AI driven automation component 212 includes an AI discovery component 214 which discovers user interface components of the application. The AI driven automation component 212 also includes an auto pilot component 216 which automatically generate one or more automation scripts for each of the user interface components of the application. The AI driven automation component 212 includes a shared repository 218 which stores a tokenized dictionary for the key words.

The AI driven automation component 212 communicates with a machine learning (ML) optimization component 220. For example, the AI driven automation component 212 may output the automation flows to the ML optimization component 220. In an embodiment, the output of the AI driven automation component 212 may be validated by a user via a prompt.

The ML optimization component 220 includes a model building component 222 which builds a machine learning model, from historical data, that is configured to build end-to-end automation flows based on given automation flows and a given tokenized dictionary. The machine learning model may be trained using historical data specific to an area associated with the application, such as application data, word tokens from the generative AI output, shared repository of automation nuggets, manual scenarios generated by generative AI, etc.

The ML optimization component 220 uses the machine learning model to build an end-to-end automation flow for testing the application, where the end-to-end automation flow connects the automation scripts generated for each of the user interface components of the application to the test cases generated for the application.

The ML optimization component 220 includes an optimization component 224 which optimizes the end-to-end automation flow. The ML optimization component 220 includes a relearning component 226 which then relearns the machine learning model based on the optimized end-to-end automation flow. Thus, the relearned machine learning model may be used for a subsequent iteration of building an end-to-end automation flow for a newly received requirement for the application.

The ML optimization component 220 communicates with a testing service 228. For example, the ML optimization component 220 may output the optimized end-to-end automation flow to the testing service 228. The output of the ML optimization component 220 may be validated by a user via a prompt. For example, the user may validate the optimization from a business and test coverage point of view.

The testing service 228 executes the end-to-end automation flow for testing the application. The testing service 228 communicates with the ALM 202. For example, the testing service 228 may output results of the testing of the application back to the ALM 202.

Figure 3:
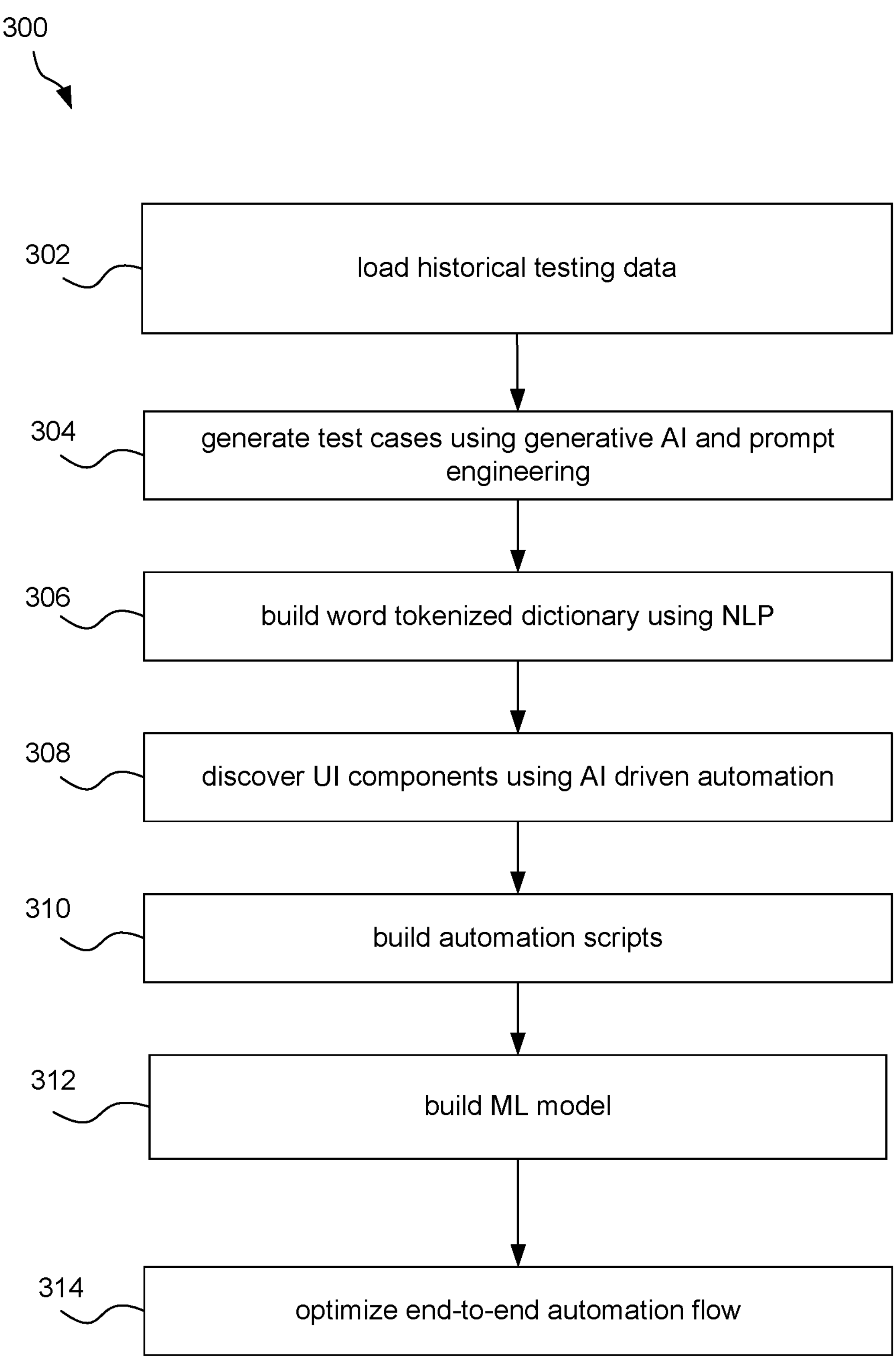
FIG. 3 illustrates a method for creating and optimizing an automation flow, in accordance with one embodiment.

FIG. 3 illustrates a method 300 for creating and optimizing an automation flow, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, historical testing data is loaded. The historical testing data may include requirement documentation, defects history with severity, test cases, traceability from requirements to test cases, parameters, tags, etc.

In operation 304, test cases are generated using generative AI and prompt engineering. For example, a description of a new requirement for the application with the relevant specification and roles may be input using prompt engineering. For example, the input may also describe if the user needs rainy- or sunny-day scenarios, and then may click an option to have the test cases generated based on the input. Generative AI may be used to generate the test cases. Recommended results indicating the test cases and a link to the relevant requirement may be output for presentation to a user. The user may then review coverage of the test cases as it relates to the requirement, and may approve the test cases accordingly.

In operation 306, a word tokenized dictionary is created using NLP. For example, ab NLP mechanism may be used to build the tokenized dictionary for automation scripts based on the historical data that was loaded.

In operation 308, UI components are discovered using AI driven automation. The AI driven automation may include learning the UI components from an HTML file and swagger document for UI and application programming interface (API) details. This AI capability enables the machine to identify all the relevant components from the application.

In operation 310, automation scripts are built. The automation scripts may be built automatically using a template automation script for each UI component. In this way, the automation foundation may be created for the automation library.

In operation 312, an ML model is built. The ML model may be built on the loaded historical data. The ML model is used to connect the automation scripts per UI component with the test cases that were recommended by the generative AI, in order to build the end-to-end automation flow.

In operation 314, the end-to-end automation flow is optimized. In an embodiment, the end-to-end automation flow may be optimized to get full coverage for the requirement.

Figure 4:
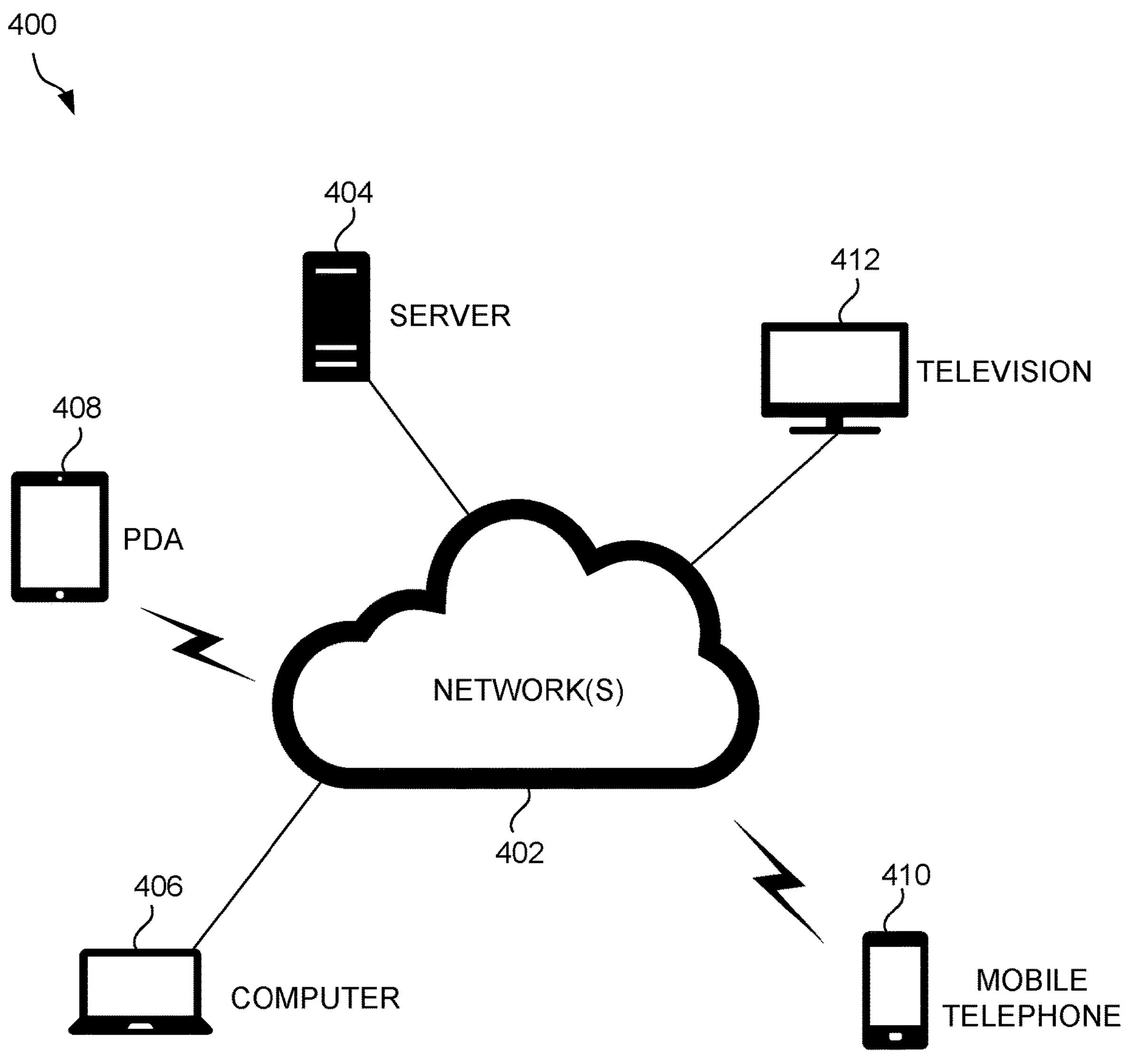
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
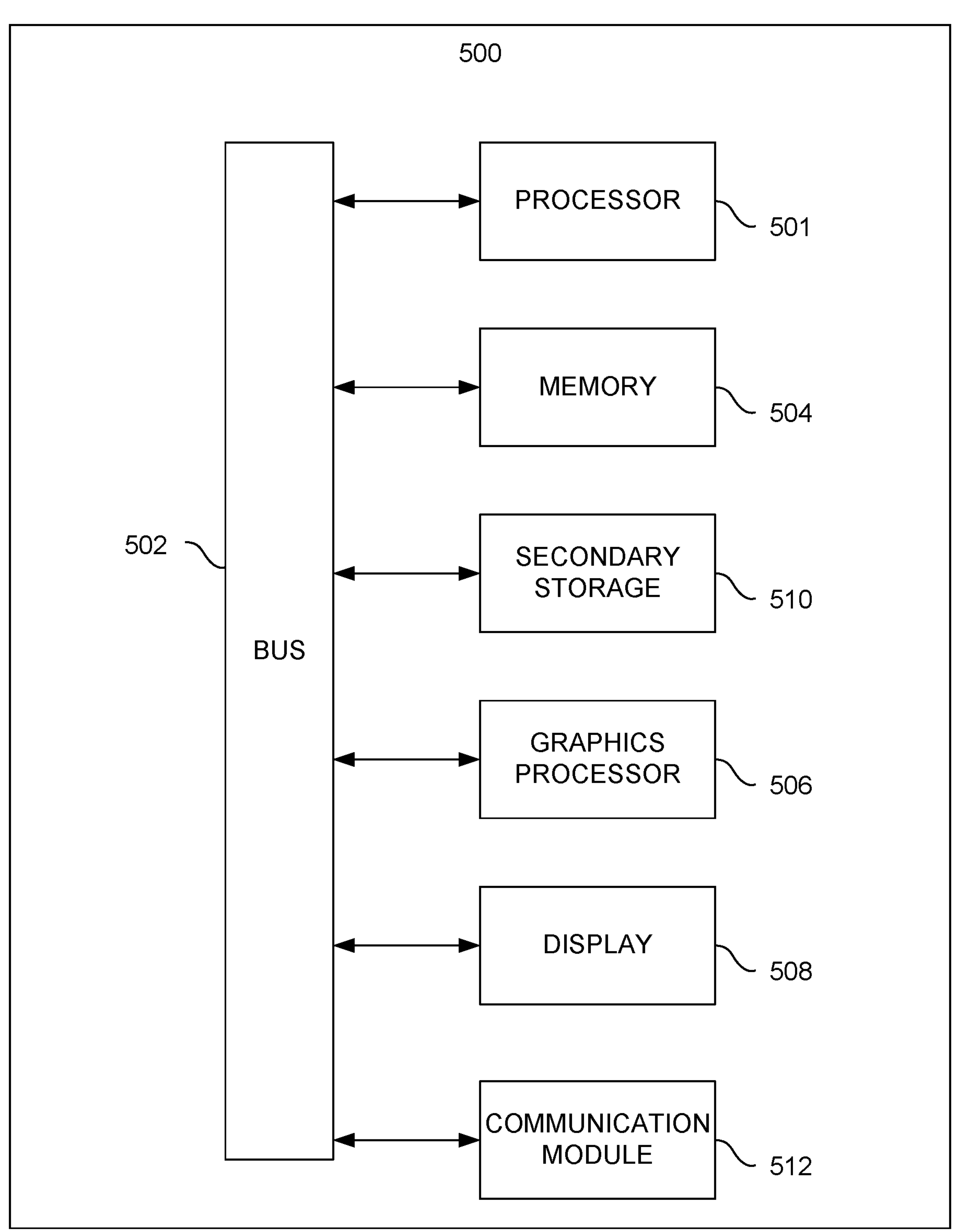
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

process a user input text prompt describing a new requirement for a new functionality of an application, using generative artificial intelligence, to generate one or more test cases for the new functionality of the application, the one or more test cases being a set of actions, which when performed, indicate whether the application satisfies the new requirement for the new functionality of the application;

determine key words of the one or more test cases;

apply dictionary-based tokenization to the key words to build a tokenized dictionary of automation assets;

learn user interface components of the application from documentation defining the application;

automatically generate one or more automation scripts for each of the user interface components of the application using a preconfigured template automation script associated with the user interface component;

process the tokenized dictionary and the one or more automation scripts using a machine learning model to build an end-to-end automation flow for testing the application in accordance with the one or more test cases generated for the application;

execute the end-to-end automation flow for testing that the application satisfies the new requirement; and outputting a result of the testing that indicates whether the application satisfies the new requirement.

2. The non-transitory computer-readable media of claim 1, wherein the input includes a description of the new requirement with a relevant specification and roles.

3. The non-transitory computer-readable media of claim 1, wherein the device is further caused to:

output the one or more test cases for acceptance by a user.

4. The non-transitory computer-readable media of claim 1, wherein the key words are determined using natural language processing.

5. The non-transitory computer-readable media of claim 1, wherein the application is a user-interface based application that includes one or more user interfaces having a plurality of user interface components.

6. The non-transitory computer-readable media of claim 1, wherein the user interface components of the application include one or more of a drop down box, a check box, a hyper link, or a radio button.

7. The non-transitory computer-readable media of claim 1, wherein the user interface components of the application are discovered by applying machine learning to a HyperText Markup Language (HTML) file and a swagger document associated with the application.

8. The non-transitory computer-readable media of claim 1, wherein the end-to-end automation flow provides full coverage testing for the new requirement.

9. The non-transitory computer-readable media of claim 1, wherein the device is further caused to:

optimize the end-to-end automation flow.

10. The non-transitory computer-readable media of claim 9, wherein the end-to-end automation flow is optimized to provide full coverage testing for the new requirement.

11. The non-transitory computer-readable media of claim 9, wherein the end-to-end automation flow is optimized to include a minimum set of test cases that provide full coverage testing for the new requirement.

12. The non-transitory computer-readable media of claim 11, wherein the end-to-end automation flow is optimized to reduce an execution time of the end-to-end automation flow.

13. The non-transitory computer-readable media of claim 9, wherein the device is further caused to:

output the optimized end-to-end automation flow for approval by a user.

14. The non-transitory computer-readable media of claim 9, wherein the device is further caused to:

relearn the machine learning model, based on the optimized end-to-end automation flow.

15. The non-transitory computer-readable media of claim 14, wherein the machine learning model is relearned based on results of executing the optimized end-to-end automation flow on the application.

16. A method, comprising:

at a computer system:

processing a user input text prompt describing a new requirement for a new functionality of an application, using generative artificial intelligence, to generate one or more test cases for the new functionality of the application, the one or more test cases being a set of actions, which when performed, indicate whether the application satisfies the new requirement for the new functionality of the application;

determining key words of the one or more test cases;

applying dictionary-based tokenization to the key words to build a tokenized dictionary-of automation assets;

learning user interface components of the application from documentation defining the application;

automatically generating one or more automation scripts for each of the user interface components of the application using a preconfigured template automation script associated with the user interface component;

processing the tokenized dictionary and the one or more automation scripts using a machine learning model to build an end-to-end automation flow for testing the application in accordance with the one or more test cases generated for the application;

executing the end-to-end automation flow for testing that the application satisfies the new requirement; and outputting a result of the testing that indicates whether the application satisfies the new requirement.

17. A system, comprising:

a non-transitory memory storing instructions; and one or more processors in communication with the non-transitory memory that execute the instructions to:

process a user input text prompt describing a new requirement for a new functionality of an application, using generative artificial intelligence, to generate one or more test cases for the new functionality of the application, the one or more test cases being a set of actions, which when performed, indicate whether the application satisfies the new requirement for the new functionality of the application;

determine key words of the one or more test cases;

apply dictionary-based tokenization to the key words to build a tokenized dictionary of automation assets;

learn user interface components of the application from documentation defining the application;

automatically generate one or more automation scripts for each of the user interface components of the application using a preconfigured template automation script associated with the user interface component;

process the tokenized dictionary and the one or more automation scripts using a machine learning model to build an end-to-end automation flow for testing the application in accordance with the one or more test cases generated for the application;

execute the end-to-end automation flow for testing that the application satisfies the new requirement; and output a result of the testing that indicates whether the application satisfies the new requirement.

* * * * *